(12) United States Patent
Sheppard

(10) Patent No.: US 7,862,409 B1
(45) Date of Patent: Jan. 4, 2011

(54) MOTORIZED HEIGHT-ADJUSTABLE TABLE APPARATUS

(76) Inventor: Barbara L. Sheppard, 1456 Al Seier Rd., Hoover, AL (US) 35226

( * ) Notice: Subject to any disclaimer, the term of this patent is extended or adjusted under 35 U.S.C. 154(b) by 108 days.

(21) Appl. No.: 12/423,736

(22) Filed: Apr. 14, 2009

(51) Int. Cl.
*A22B 5/00* (2006.01)

(52) U.S. Cl. ..................................................... 452/198

(58) Field of Classification Search ................. 452/198; 108/147, 148, 146, 144.11, 147.19; 248/188.5, 248/631, 676, 357
See application file for complete search history.

(56) References Cited

U.S. PATENT DOCUMENTS

| | | | | |
|---|---|---|---|---|
| 4,126,096 A | * | 11/1978 | Arnaud Malavard | 108/145 |
| 5,230,290 A | * | 7/1993 | Crossman | 108/147 |
| 5,758,586 A | | 6/1998 | Kieser et al. | |
| 6,352,103 B1 | * | 3/2002 | Chu et al. | 165/80.3 |
| 6,546,880 B2 | | 4/2003 | Agee | |
| 6,874,432 B2 | * | 4/2005 | Lanphear | 108/147 |
| 6,977,476 B2 | | 12/2005 | Koch | |
| 7,412,931 B2 | * | 8/2008 | Seidl et al. | 108/147 |
| 7,677,518 B2 | * | 3/2010 | Chouinard et al. | 248/370 |

* cited by examiner

*Primary Examiner*—Thomas Price
(74) *Attorney, Agent, or Firm*—Crossley Patent Law; Mark A. Crossley

(57) ABSTRACT

A motorized height-adjustable table apparatus including a table having a meat-cheese slicer mounted on a work surface thereof and having telescopic legs connected by a pair of perpendicular crossbars which are raised and lowered by a motor having a threaded shaft extending downwardly from a motor center axis, the shaft rotationally engaging an aperture in the center of the crossbars. The motor may be controlled by a hand-operated or a foot-operated control device.

8 Claims, 3 Drawing Sheets

MOTORIZED HEIGHT-ADJUSTABLE TABLE APPARATUS

BACKGROUND OF THE INVENTION

Various types of height-adjustable tables have been provided in the past. However, what is needed is a motorized height-adjustable table that includes a meat-cheese slicer having a support structure that facilitates the selective height adjustment of the slicer during use by means of a selectively operable motorized adjustment assembly.

FIELD OF THE INVENTION

The present invention relates to tables, and more particularly, to a motorized height-adjustable table including a meat-cheese slicer having a support structure that facilitates the selective height adjustment of the slicer during use by means of a selectively operable motorized adjustment assembly.

SUMMARY OF THE INVENTION

The present motorized height-adjustable table is designed to raise and lower a meat-cheese slicer mounted onto the table work surface to a desired vertical position which accommodates the slicer operator's height thereby increasing workplace safety.

The instant motorized height-adjustable table decreases the risk of operator-employee injury from lifting and lowering a heavy slicer, reduces workers' compensation claims as a result, decreases loss of manpower, and increases morale.

Thus has been broadly outlined the more important features of the present motorized height-adjustable table and method so that the detailed description thereof that follows may be better understood and in order that the present contribution to the art may be better appreciated.

Numerous objects, features and advantages of the present motorized height-adjustable table will be readily apparent to those of ordinary skill in the art upon reading the following detailed description of presently preferred, but nonetheless illustrative, examples of the present motorized height-adjustable table and method when taken in conjunction with the accompanying drawings. In this respect, before explaining the current examples of the present motorized height-adjustable table and method in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the motorized height-adjustable table and method. It is therefore important that the claims be regarded as including such equivalent constructions insofar as they do not depart from the spirit and scope of the present invention.

Objects of the present motorized height-adjustable table and method, along with to various novel features that characterize the invention are particularly pointed out in the claims forming a part of this disclosure. For better understanding of the motorized height-adjustable table and method, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
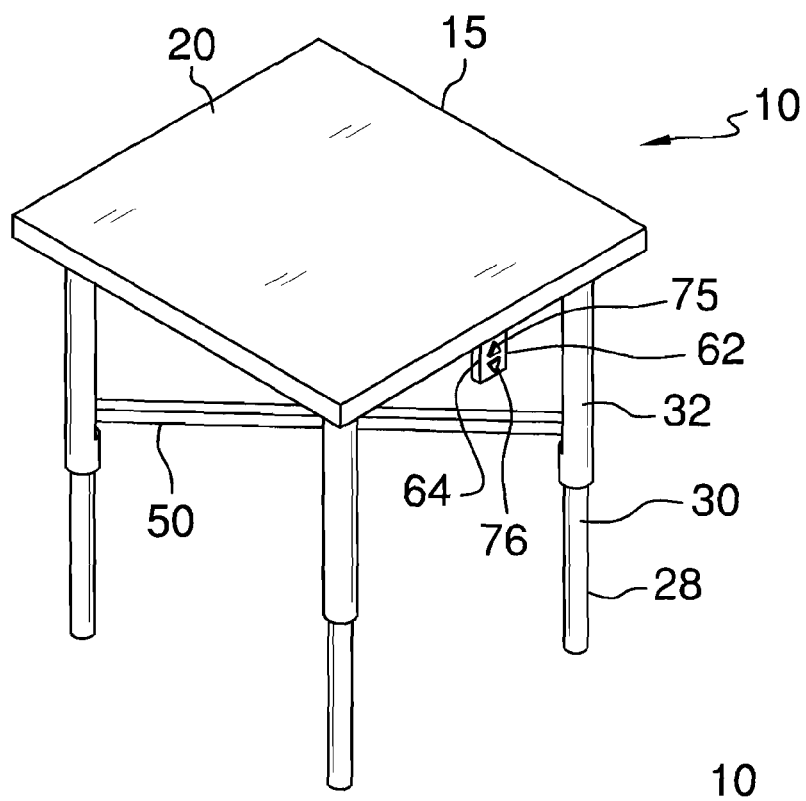
FIG. 1 is a front isometric view illustrating extension legs in extended position.
Figure 2:
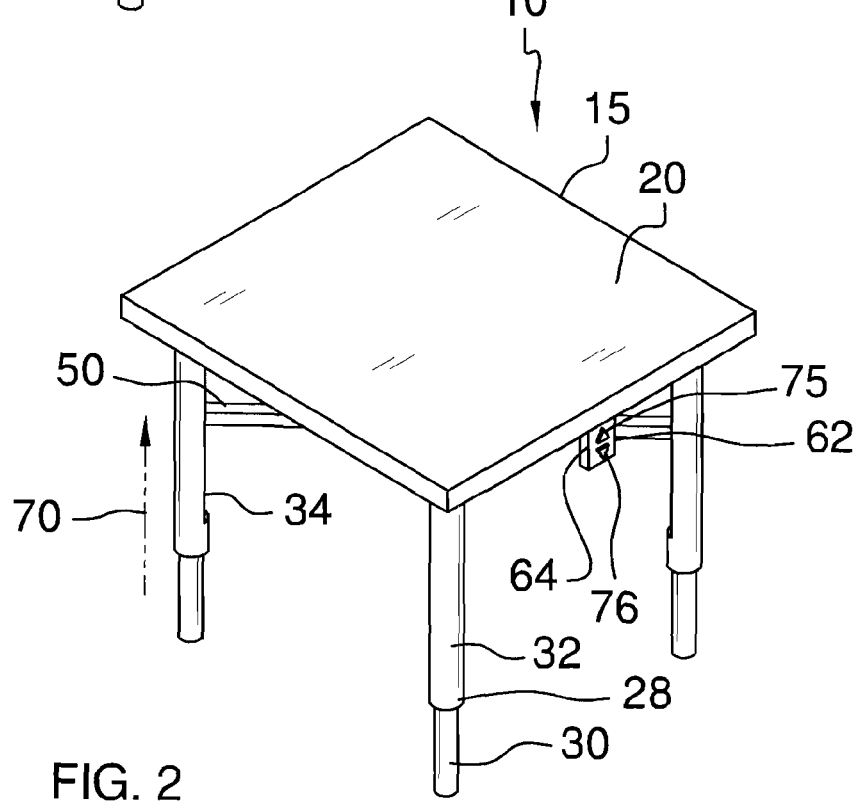
FIG. 2 is a front isometric view illustrating extension legs in retracted position.
Figure 3:
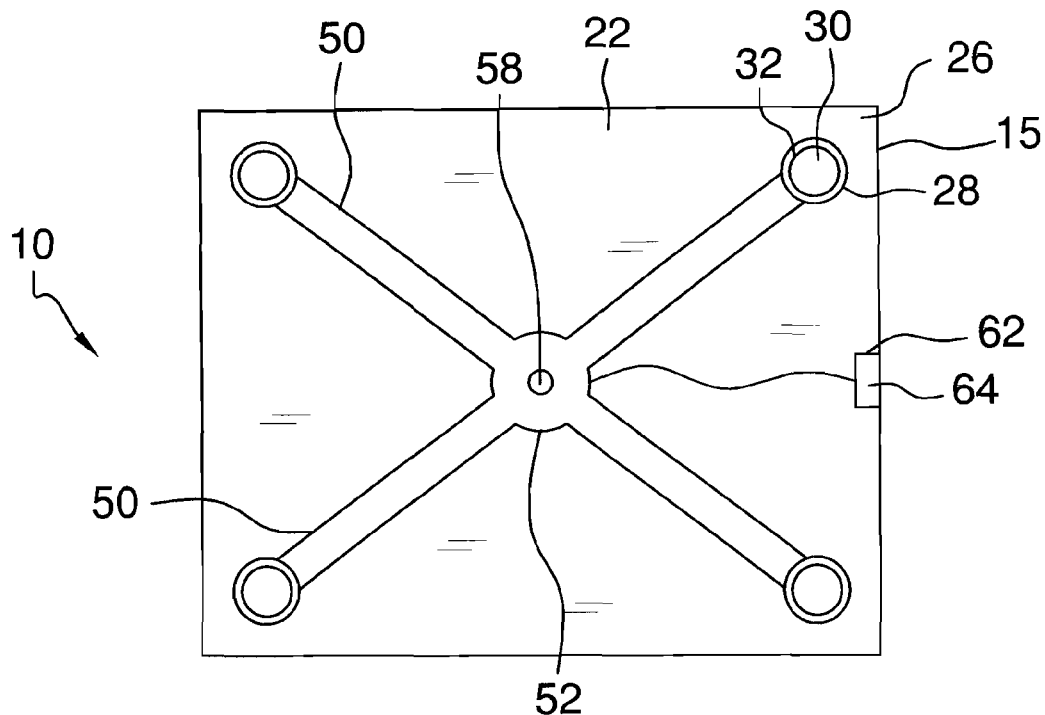
FIG. 3 is a bottom plan view.
Figure 4:
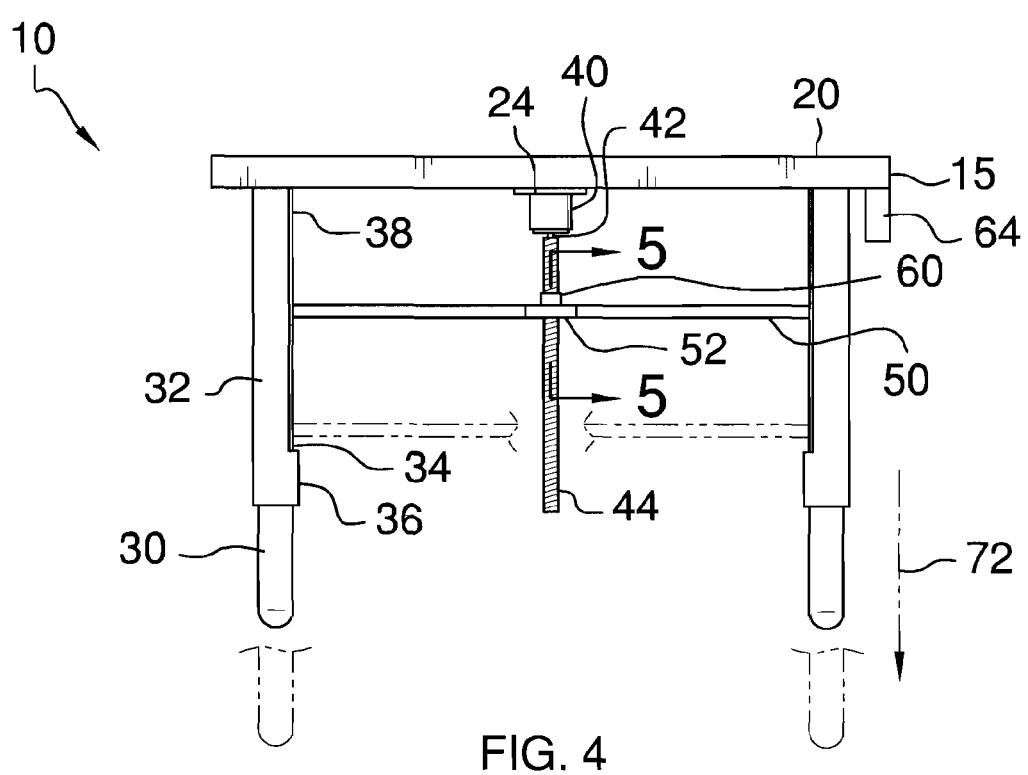
FIG. 4 is a side elevation view.
Figure 5:
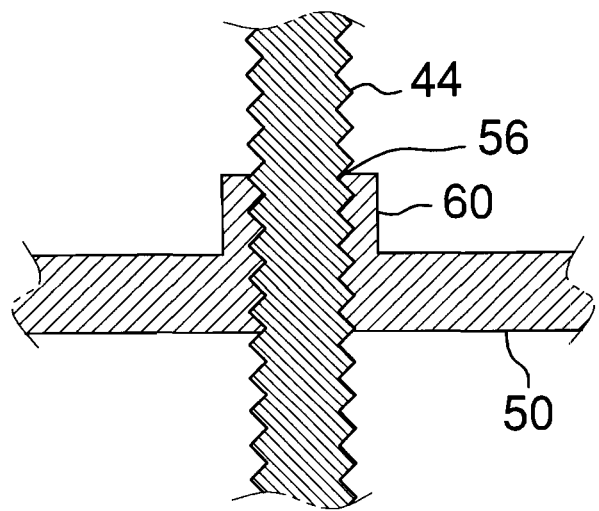
FIG. 5 is a cross-section view taken along line 5-5 of FIG. 4.
Figure 6:
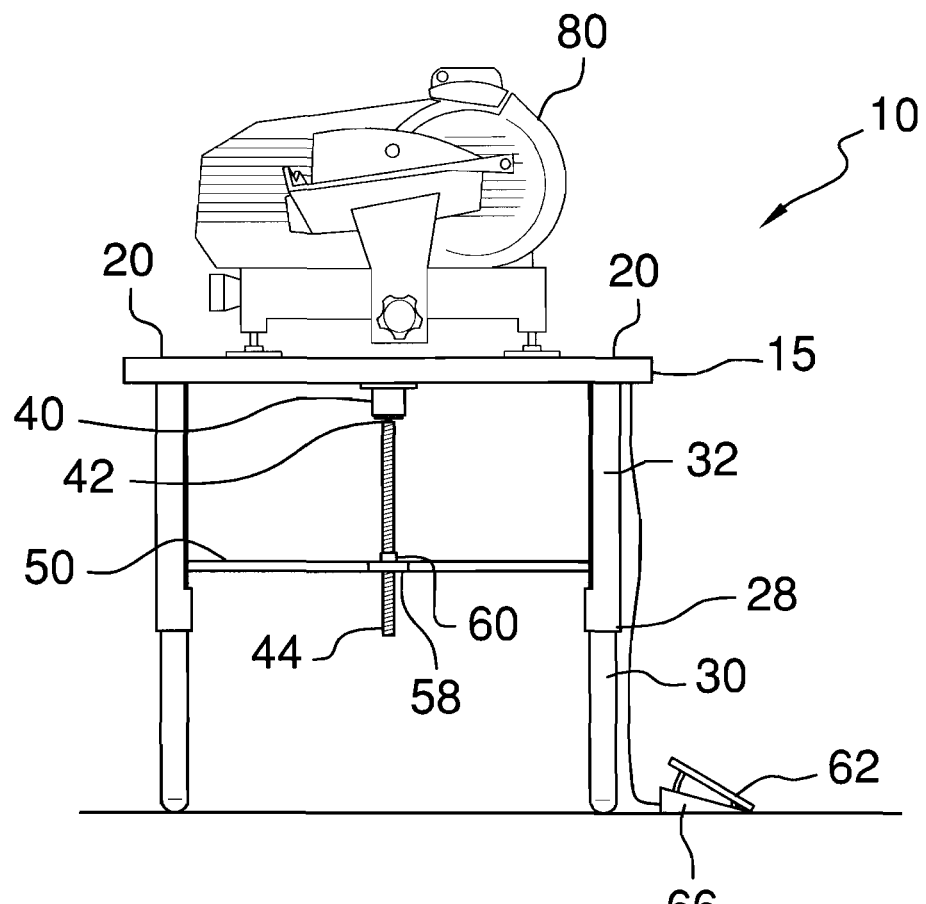
FIG. 6 is an in-use side elevation.

With reference now to the drawings, and in particular FIGS. 1 through 6 thereof, example of the instant motorized height-adjustable table apparatus employing the principles and concepts of the present motorized height-adjustable table apparatus and generally designated by the reference number 10 will be described.

Referring to FIGS. 1 through 6, the present motorized height-adjustable table apparatus 10 is illustrated. The apparatus 10 selectively adjusts to a desired vertical position of a meat-cheese slicer 80. Generally, the apparatus 10 includes a table 15 with telescopic legs 28 and crossbars 50 which are raised and lowered by a motor-controlled shaft 44. The table 15 has a flat planar work surface 20, a bottom side 22, and four opposing corners 26. The bottom side 22 has a center portion 24. The table 15 may be parallelepiped. A telescopic leg 28 is attached to each corner 26. Each leg 28 has an inside base 30 and an outside sleeve 32. The inside base 30 is in is telescoping communication with the outside sleeve 32. An elongated vertical slot 34 is disposed along an upper portion 38 of an inside edge 36 of each leg 28 outside sleeve 32.

A motor 40 is permanently attached to the table 15 bottom side 22 center portion 24. The motor 15 has a vertical center axis 42. A threaded shaft 44 extends downwardly from the center axis 42 of the motor 15. The motor 15 operationally engages the threaded shaft 44.

A pair of crossbars 50 are disposed in perpendicular position to each other. The crossbars 50 are conjoined at a center section 52. An outer end 54 of each crossbar 50 is permanently attached to a leg 28 inside base 30 through the vertical slot 34 on the inside edge 36 of each leg 28 outside sleeve 32.

A threaded aperture 56 is disposed in a center area 58 in the center section 52. The shaft 44 rotationally engages the threaded aperture 56. In addition, a collar 60 surrounds the threaded aperture 56.

A control means 62 is in operational communication with the motor 40. The control means 62 may be a hand-operated control device 64 selectively engaging the motor 40 threaded shaft 44 in a first direction 70 and in a second direction 72. The selective engagement of the motor 40 threaded shaft 44 by the hand-operated control to device 64 in the first direction 70 raises the crossbars 50 and retracts the legs 28. The selective engagement of the motor 40 threaded shaft 44 by the hand-operated control device 64 in the second direction 72 lowers the crossbars 50 and extends the legs 28. The hand-operated control device 64 may be disposed on the table 15 bottom side 22. The hand-operated control device 64 includes an upwardly pointed arrow 75 and a is downwardly pointed arrow 76. The upwardly pointed arrow 75 selectively activates the control device 64 whereby the control device 64 engages the motor 40 threaded shaft 44 in the first direction 70. The downwardly pointed arrow 76 selectively activates the control device 64 whereby the control device 64 engages the motor 40 threaded shaft 44 in the second direction 72.

The apparatus 10 also includes a meat-cheese slicer 80 removably attached to the work surface 20. The control means 62 allows a user to adjust the height of the table 15 to place the meat-cheese slicer 80 in a desired vertical position.

The present motorized height-adjustable table apparatus 10 as described hereinabove may also provide a control means 62 in the form of a foot-operated control device 66 which selectively engages the motor 40 threaded shaft 44 in a first direction 70 and in a second direction 72. The selective engagement of the motor 40 threaded shaft 44 by the foot-operated control device 66 in the first direction 70 raises the crossbars 50 and retracts the legs 28. The selective engagement of the motor 40 threaded shaft 44 by the control device 66 in the second direction 72 lowers the crossbars 50 and extends the legs 28.

The apparatus 10 is constructed to allow the height to be adjusted up to about 2 feet. The apparatus 10 is constructed primarily from metal.

With respect to the above description then, it is to be realized that the optimum dimensional relationships for the parts of the present motorized height-adjustable table to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A motorized height-adjustable table apparatus selectively adjustable to a desired vertical position of a meat-cheese slicer, the apparatus comprising, in combination:
    a table having a flat planar work surface, a bottom side having a center portion, and four corners;
    a telescopic leg attached to each corner, each leg comprising an inside base and an outside sleeve, the inside base in telescoping communication with the outside sleeve;
    an elongated vertical slot disposed along an upper portion of an inside edge of each leg outside sleeve;
    a motor permanently attached to the table bottom side center portion, the motor having a vertical center axis;
    a threaded shaft extending downwardly from the center axis of the motor, the motor operationally engaging the threaded shaft;
    a pair of crossbars disposed in perpendicular position to each other, the crossbars conjoined at a center section;
    an outer end of each crossbar permanently attached to a leg inside base through the vertical slot on the inside edge of each leg outside sleeve;
    a threaded aperture disposed in a center area in the center section, the shaft rotationally engaging the threaded aperture;
    a collar surrounding the threaded aperture;
    a control means in operational communication with the motor; and
    a meat-cheese slicer removably attached to the work surface.

2. The apparatus of claim 1 wherein the control means is a hand-operated control device selectively engaging the motor threaded shaft in a first direction and in a second direction.

3. The apparatus of claim 1 wherein the table is parallelepiped.

4. The apparatus of claim 2 wherein the selective engagement of the motor threaded shaft by the control device in the first direction raises the crossbars and retracts the legs and the selective engagement of the motor threaded shaft by the control device in the second direction lowers the crossbars and extends the legs.

5. The apparatus of claim 4 wherein the control device is disposed on the table bottom side.

6. The apparatus of claim 5 wherein the control device comprises an upwardly pointed arrow and a downwardly pointed arrow;
    is wherein the upwardly pointed arrow selectively activates the control device whereby the control device engages the motor threaded shaft in the first direction; and
    wherein the downwardly pointed arrow selectively activates the control device whereby the control device engages the motor threaded shaft in the second direction.

7. A motorized height-adjustable table apparatus selectively adjustable to a desired vertical position of a meat-cheese slicer, the apparatus comprising, in combination:
    a parallelpiped table having a flat planar work surface, an bottom side having a center portion, and four corners;
    a telescopic leg attached to each corner, each leg comprising an inside base and an outside sleeve, the inside base in telescoping communication with the outside sleeve;
    an elongated vertical slot disposed along an upper portion of an inside edge of each leg outside sleeve;
    a motor permanently attached to the table bottom side center portion, the motor having a vertical center axis;
    a threaded shaft extending downwardly from the center axis of the motor, the motor operationally engaging the threaded shaft;
    a pair of crossbars in perpendicular position to each other, the crossbars conjoined at a center section;
    an outer end of each crossbar permanently attached to a leg inside base through the vertical slot on the inside edge of each leg outside sleeve;
    a threaded aperture disposed in a center portion in the center section, the shaft rotationally engaging the threaded aperture;
    a collar surrounding the threaded aperture;
    a control means in operational communication with the motor, the control means comprising a foot-operated control device selectively engaging the motor threaded shaft in a first direction and in a second direction;
    a meat-cheese slicer removably attached to the work surface.

8. The apparatus of claim 7 wherein the selective engagement of the motor threaded shaft by the control device in the first direction raises the crossbars and retracts the legs and the selective engagement of the motor threaded shaft by the control device in the second direction lowers the crossbars and extends the legs.

* * * * *